May 8, 1923.
E. R. JONES
TWINE CUTTER
Filed May 2, 1922
1,454,543
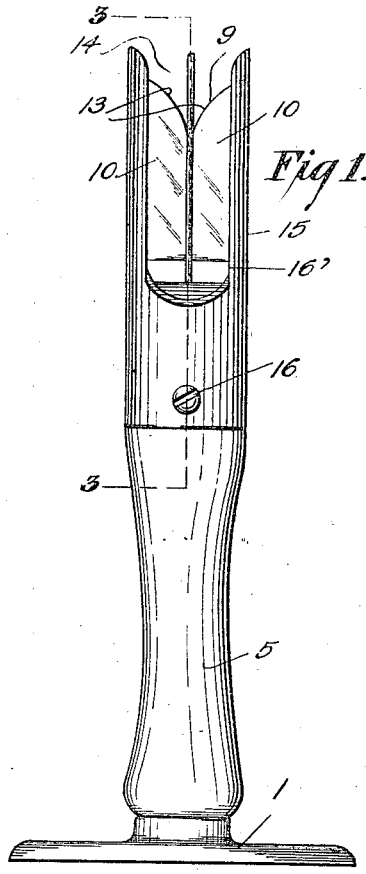
Fig.1.
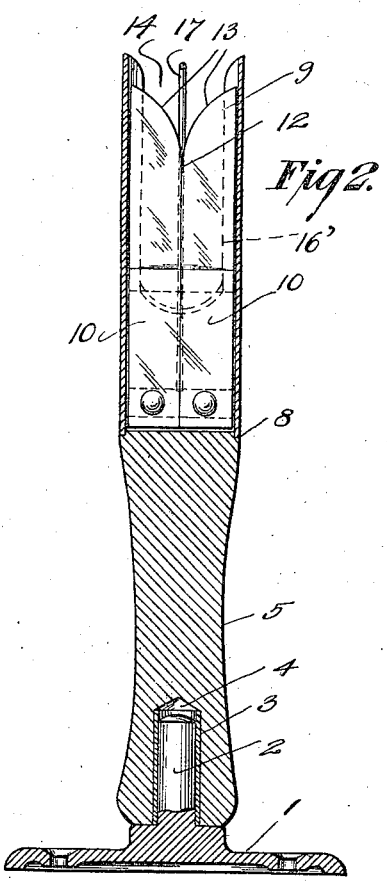
Fig.2.
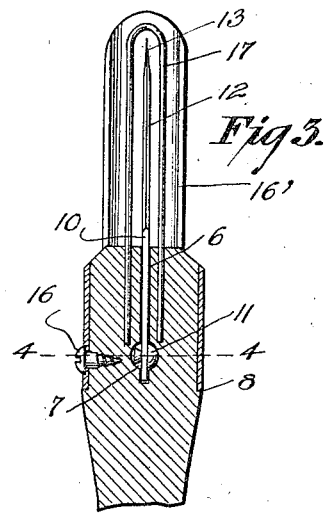
Fig.3.
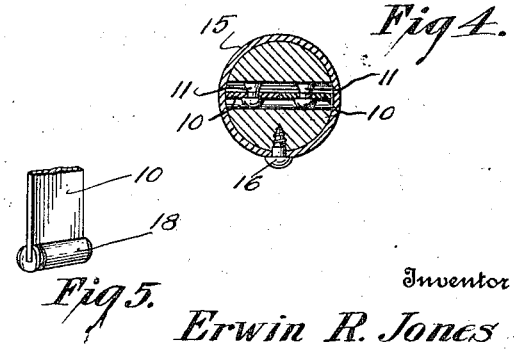
Fig.4.
Fig.5.
Inventor
Erwin R. Jones
By C. C. Shepherd
Attorney Patented May 8, 1923.

1,454,543

UNITED STATES PATENT OFFICE.

ERWIN R. JONES, OF COLUMBUS, OHIO.

TWINE CUTTER.

Application filed May 2, 1922. Serial No. 557,913.

*To all whom it may concern:*

Be it known that I, ERWIN R. JONES, a citizen of the United States, residing at Columbus, in the county of Franklin and State of Ohio, have invented certain new and useful Improvements in Twine Cutters, of which the following is a specification.

The present invention is directed to improvements in twine or cord cutters, and has for its primary object to provide a device of this character constructed in such manner that it can be used when resting upon a counter or the like for severing the twine upon comparatively light packages, or it may be conveniently lifted for severing the twine upon heavy packages.

A further object of the invention is to provide a device of this nature so constructed that twine or cord of various diameters may be guided into severing relation with the cutting element.

A still further object of the invention is to provide a device of this kind which can be readily assembled, and one wherein the cutting blades may be quickly removed for sharpening or replacement.

Still another object of the invention is to provide a device of this kind having a pair of blades arranged with their cutting edges for a portion of their length in contacting relation so as to quickly sever the twine or cord when placed therebetween.

With these and other objects in view, as will appear as the description proceeds, the invention consists in the novel features of construction, combinations of elements and arrangements of parts, and hereinafter to be fully described and pointed out in the appended claims.

In the accompanying drawing:

Figure 1 is a side elevation of the device,

Figure 2 is a vertical sectional view,

Figure 3 is a sectional view on line 3—3 of Figure 1,

Figure 4 is a sectional view on line 4—4 of Figure 3, and

Figure 5 is a detail fragmentary perspective view of the member.

The device comprises a base 1, preferably formed from metal, which may be, if desired, fixed to a counter or the like. Rising centrally from the base is a post 2, which is adapted to enter the ferrule 3 located in the socket 4, said socket being formed in the lower end of the wooden handle 5. The ferrule is of such size that it will snugly engage the post 2 to hold the handle in a vertical position, but at the same time permitting the handle to be conveniently moved from the base.

The upper end of the handle has formed therein a vertical slot 6, the lower end of which opens into a circular transverse groove 7, there being an annular shoulder 8 formed on the handle at a point slightly below the base of the groove 7. The cutting element 9 comprises a pair of blades 10, the lower ends of which are provided with fixed transversely disposed projections 11, the length of which being such that they will snugly engage the sides of the groove 7, and at which time portions of the blades occupy the slot 6. The blades are provided with cutting edges 12 and 13, the latter being curved outwardly so as to provide a substantially V shaped entrance or guide 14.

A tubular guard 15 is employed and is detachably engaged with the upper end of the handle 5, and since the lower ends of the blades 10 are flush with the outer surface of the handle at points above the shoulder it will be apparent that the lower end of the guard will prevent outward movement of the blades, inward movement thereof being prevented due to the fact that their inner edges are in contacting relation. The lower edge of the guard rests upon the shoulder 8 and in order to prevent accidental disengagement of the guard from the handle a screw 16 is passed therethrough for engagement with the handle.

The guard 15 is provided with registering slots 16′ which are of such length as to permit passage of twine or cord between the opposed cutting edges of the blades 10 for a certain distance of their length.

This guard serves to protect the user against injury in an obvious manner, and also serves to retain the blades 10 in their operative positions, but at the same time upon removal of the guard the blades can be quickly detached for sharpening or replacement.

As an additional precaution against injury to the user, a supplemental guard 17 is employed and consists of a single length of suitable gauge wire bent so as to provide an inverted U shaped frame, the terminals of which are engaged in the upper end of the handle and upon opposite sides of the blades 10. The bight portion of the frame or guard is positioned above the upper ends of the blades 10 and disposed at right angles thereto.

When tying packages, which are comparatively light, the handle is placed on the base 1, and the package lifted so that the twine can be positioned between the blades for severing the same. In instances where a package is comparatively heavy and can not be conveniently lifted to position the twine for the severing operation, the handle 5 is removed from the base 1 and the device is positioned so as to bring the blades into cutting relation with the twine. Owing to the fact that the blades 10 have curved cutting edges, the twine to be severed will be guided thereto and subjected to an initial severing operation, the final severing being had when the twine is pressed between the straight edges 12.

In the modified form of the invention, as shown in Figure 5 of the drawing, the blades 10 are provided at their lower ends with elongated rounded heads 18 which are adapted to snugly engage the groove 7 when the blades 10 occupy the slot 6, outward movement of the blades being prevented by the lower end of the tubular guard 15.

What is claimed is:

1. A twine cutter, a handle, a pair of blades associated with the handle, and a tubular guard for the blades engaged with the handle and blades for holding the blades against accidental disengagement from the handle.

2. A twine cutter, a handle, blades having projections detachably engaged with the handle, a tubular guard enclosing the handle and engaging the blades to hold the blades with the cutting edges in confronting relation.

3. A twine cutter, a handle, said handle having a transverse groove formed therein, blades having lateral projections carried thereby for detachably engaging the groove, and a tubular guard enclosing the handle and engaged with the blades throughout their length to limit the movement of blades thereof away from each other.

4. A twine cutter, a handle, said handle having a transverse groove formed therein, a pair of blades having means on their lower ends for detachable engagement with the groove, a tubular guard encircling the handle and engaged with the blades to hold the same with their cutting edges in confronting relation.

5. A twine cutter, a handle having a transverse groove and slot formed therein and in communication with each other, a pair of blades engaged in the slot and having means carried thereby for engaging the groove, to prevent vertical movement of the blades, and a tubular guard encircling the handle and engaged with the back of the blades.

6. A twine cutter, a base, a handle removably mounted on the base, a pair of blades removably connected to the upper end of the handle, and having their cutting edges disposed in confronting relation, a tubular guard detachably engaged with the upper end of the handle and having registered slots in its sides to expose the blades, an inverted U shaped guard connected with the handle and having its bight portion disposed at right angles to the blades, and its side arms extending longitudinally of the cutting edges of the blades, said tubular guard serving to hold the blades against lateral movement.

In testimony whereof I affix my signature.

ERWIN R. JONES.